United States Patent
Tondorf

[19]

[11] Patent Number: 6,114,947
[45] Date of Patent: Sep. 5, 2000

[54] METHOD OF TRANSMITTING INFORMATION AND A DEVICE SUITABLE THEREFORE

[75] Inventor: Sebastian Tondorf, Waging, Germany

[73] Assignee: Dr. Johannes Heidenhain GmbH, Traunreut, Germany

[21] Appl. No.: 08/831,508

[22] Filed: Apr. 1, 1997

[30] Foreign Application Priority Data

Apr. 6, 1996 [DE] Germany ............... 196 13 884

[51] Int. Cl.[7] ................................................ H04M 11/04
[52] U.S. Cl. .......................... 340/310.01; 340/310.08; 340/538
[58] Field of Search ............. 340/310.01, 310.02, 340/310.03, 310.06, 310.07, 310.08, 538, 511, 555, 825.36, 825.49; 324/76.26; 379/66; 375/37

[56] References Cited

U.S. PATENT DOCUMENTS

| | | | |
|---|---|---|---|
| 3,340,500 | 9/1967 | Boyd et al. | 340/310.01 |
| 4,423,958 | 1/1984 | Schmitt | 356/375 |
| 4,520,488 | 5/1985 | Houvig et al. | 375/5 |
| 4,620,189 | 10/1986 | Farque | 340/856 |
| 4,719,616 | 1/1988 | Akano | 370/11 |
| 5,241,173 | 8/1993 | Howley et al. | 250/231.16 |
| 5,642,091 | 6/1997 | Coenen et al. | 340/310.02 |
| 5,691,814 | 11/1997 | Strasser | 356/375 |
| 5,742,225 | 4/1998 | Wetzel et al. | 340/310.02 |

FOREIGN PATENT DOCUMENTS

| | | |
|---|---|---|
| 0 514 081A | 11/1992 | European Pat. Off. |
| 0555 869A2 | 8/1993 | European Pat. Off. |
| 0 514 081 | 2/1996 | European Pat. Off. |
| 30 10 611 | 6/1983 | Germany. |
| 34 45 617 | 4/1987 | Germany. |
| 38 29 815 | 10/1990 | Germany. |
| WO 93/05272 | 3/1993 | WIPO. |

OTHER PUBLICATIONS

A. Ernst, Digitale Längen–und Winkelmeßtechnik [Digital Linear and Angular Measuring Technology] by Verlag moderne Industrie AG, Landsberg, vol. 3, pp. 8–29 (1993).

Primary Examiner—Daniel J. Wu
Assistant Examiner—Toan Pham
Attorney, Agent, or Firm—Brinks Hofer Gilson & Lione

[57] ABSTRACT

A transmission of information takes place between a scanning unit of a position measuring system and an evaluation and power supply unit connected therewith through a power supply line which connects the scanning unit and the downstream-connected evaluation and power supply unit. The transmitted information relates, for example, to the position-dependent analog scanning signals generated by the scanning unit.

69 Claims, 5 Drawing Sheets

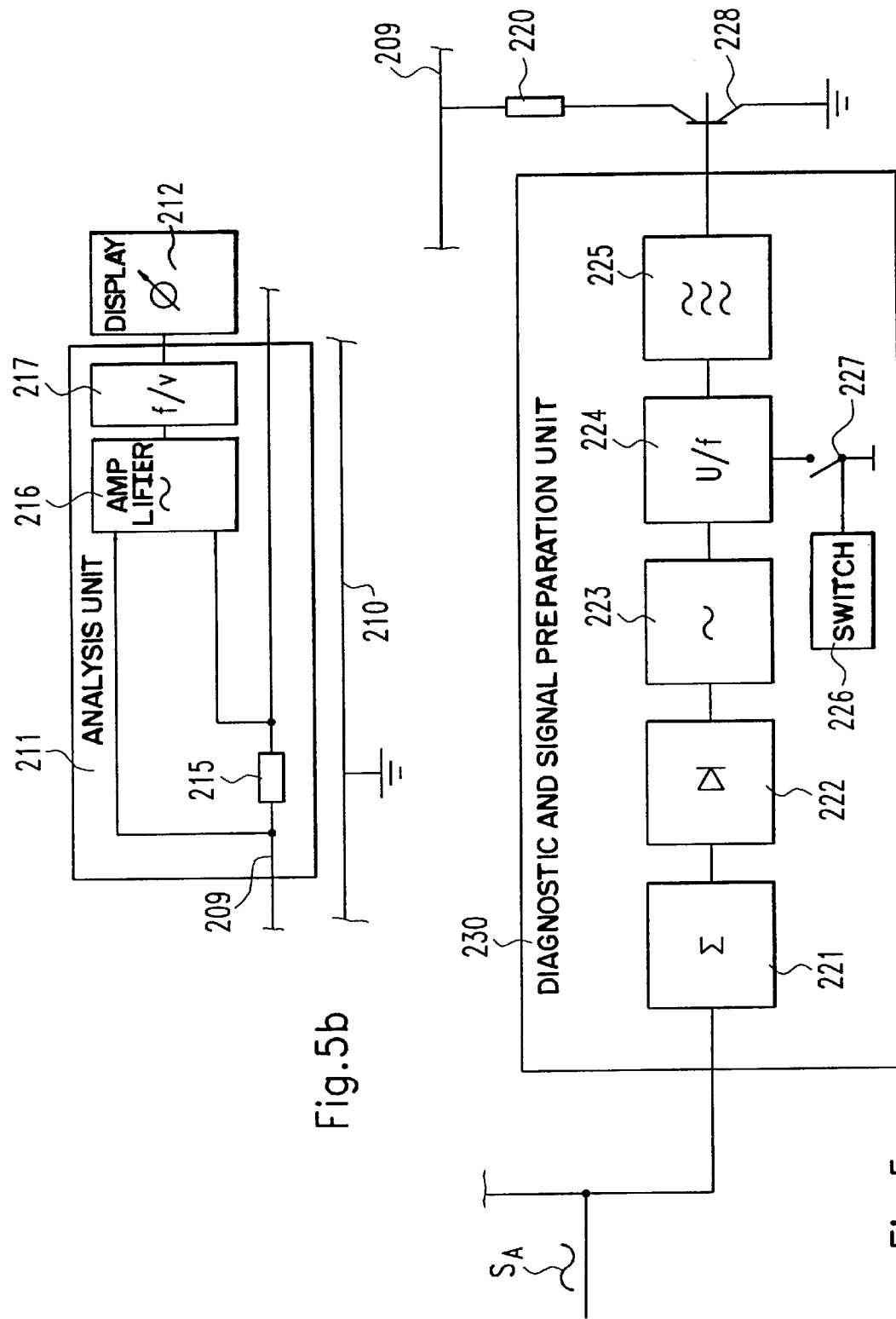

METHOD OF TRANSMITTING INFORMATION AND A DEVICE SUITABLE THEREFORE

FIELD OF THE INVENTION

The present invention relates to a method of transmitting information between the scanning unit of a position measuring system and a downstream-connected evaluation and power supply unit and a corresponding position measuring system which is designed for executing such a method.

BACKGROUND OF THE INVENTION

Scanning of a scale graduation in known position measuring systems, for example on an optical basis, is customarily performed with the aid of a scanning unit. Initially the scanning unit provides analog scanning signals, for example in sine or cosine form, which are further processed to provide position evaluation. There are several options for the further processing of these signals. For example, position measuring systems with analog as well as with digital signal output exist, where an electronic evaluation system which processes the analog signals is partially integrated into the measuring system. It is also possible to digitize the analog scanning signals in the scanning unit. TTL signals, for example, then result at the output of such a position measuring system which can be supplied to the numerical control of a machine tool.

For varying purposes it is now of interest to the respective user to be able to check the originally generated analog scanning signals, usually sine or cosine shaped, in order to perform or control the correct mounting of the scanning unit. Furthermore, such an option during the actual measuring process also makes sense in order to detect possible malfunctions in the system early on. In this connection the amplitude or the respective signal offset of the generated analog signal, for example, are of interest in order to be able to evaluate the signal quality. Furthermore, other information specifically of the measuring system can be of interest for the user, for example, the position of reference marks or information regarding the status of the scanning light source, etc.

An error report device associated with the scanning unit is known from German Patent Publication No. DE 38 29 815, which monitors the generated analog scanning signals and transmits error recognition signals to a downstream connected evaluation unit through a separate error signal line. Activation of the error reporting device is accomplished by sending a defined activation signal over the error signal line from the evaluation unit to the scanning unit. With this solution at least one additional transmission line is necessary both for the transmission of the activation signal and the actual error signal.

Other arrangements which have one or several such transmission lines for transmitting error-related information or their activation in connection with analog scanning signals are also described in U.S. Pat. No. 4,423,958 and German Patent Publication No. DE 34 45 617.

It is also known to perform such checking of the analog scanning signals generated by the scanning unit, including the error indication, by use of colored LEDs directly at the scanning unit as described in U.S. Pat. No. 5,241,173. However, the information regarding the quality of the analog scanning signals is not available for further processing in the evaluation unit. Thus there is only a limited usefulness of this information, in particular with regard to the correct mounting of the scanning unit.

SUMMARY OF THE PRESENT INVENTION

It is therefore an object of the present invention to create a method as well as a device for making measuring system-related information available to an evaluation unit with a minimum amount of hardware necessary for the transmission of such further signals. In this connection the most varied use of this information should be possible as well as the flexible adaptation to various monitoring requirements. The measuring system-related information refers, for example, to the analog scanning signals generated by the scanning unit.

In accordance with the present invention already existing connecting lines or power supply lines between the scanning device and the downstream-connected evaluation and power supply unit are used for the transmission of measuring system-related information. An advantageous reduction of required connecting lines between the position measuring system and the downstream-connected evaluation and power supply unit is the result of this multiple use of the power supply lines. Furthermore, additional lines for transmitting information between the measuring unit and the evaluation and power supply unit are not necessary. Thus the usual number of communication lines between the measuring unit and the evaluation and power supply unit does not have to be increased. Common interfaces for connecting the measuring unit and the evaluation and power supply unit can be used even though the number of transmitted signals is increased.

Furthermore, the present invention also permits an extremely flexible adaptation to different measuring systems as well as control requirements on the part of the user. In this way the measurement system-related information of interest can be processed in the most diverse manner for transmission over the power supply line(s), for example in the form of the most diverse modulation methods, etc. Depending on the type and size of the information to be transmitted, processing methods of greater or lesser elaboration can be employed.

The method and device in accordance with the present invention can also be laid out extremely flexibly with respect to the evaluation of the transmitted information. The display can, for example, take place in a simple visual representation of the two operational states "correct scanning signal form" or "erroneous scanning signal form". Alternatively a more detailed display can also be realized in accordance with the present invention.

Furthermore diverse options for generating the information regarding the analog scanning signals by means of the scanning unit exist. For example, this can take place by an appropriate analysis of the actual analog scanning signals as well as by an additionally performed scanning process or testing process for analytical purposes.

BRIEF DESCRIPTION OF THE DRAWINGS

FIG. 5a is a block diagram of a diagnostic and signal preparation unit according to a preferred embodiment of the present invention.

FIG. 5b is a block diagram of an analysis unit according to a preferred embodiment of the present invention.

DETAILED DESCRIPTION OF THE PRESENTLY PREFERRED EMBODIMENTS

Figure 1:
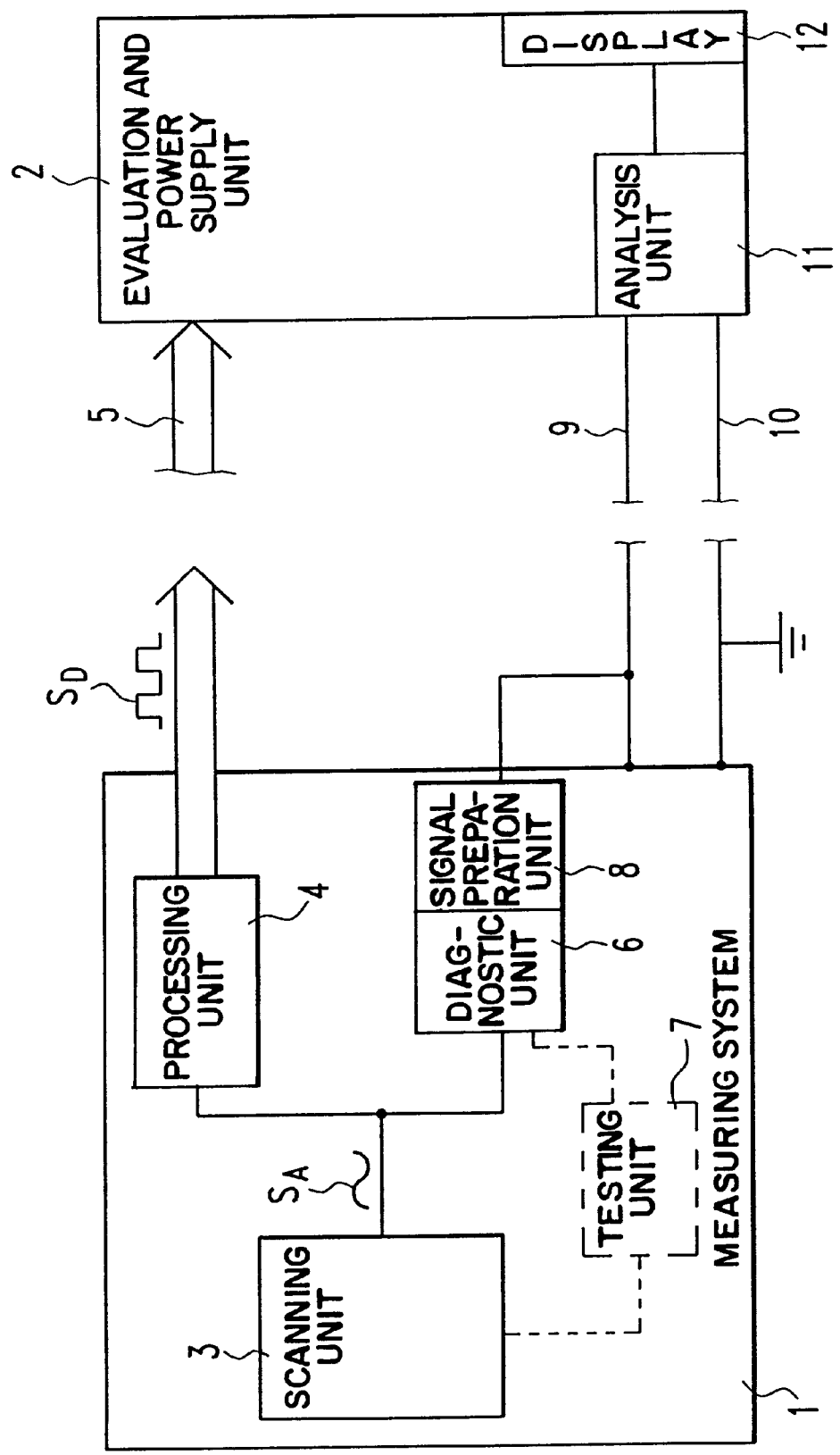
FIG. 1 is a block diagram of a position measuring system according to a preferred embodiment of the present invention.

A detailed description of the method and device according to a preferred embodiment of the present invention will be described with reference to the block diagram shown in FIG. 1.

The position measuring system includes a measuring system 1 as well as an evaluation and power supply unit 2 connected downstream of the measuring system 1. The representation of the evaluation and power supply unit 2 selected in FIG. 1 is of course to be understood as merely schematic in form, and it is in no way essential for the present invention that the various evaluation and service components are housed inside the same structural unit.

On the output side, the measuring system 1 provides position-dependent signals $S_D$, which are further processed via signal transmission lines to the downstream located evaluation and power supply unit 2. In the exemplary embodiment represented, the transmitted signals $S_D$ are provided in digital form and are formed from the originally analog signals $S_A$, which are generated by a scanning unit 3 in the measuring system 1. In one preferred embodiment, the measuring system 1 is realized as a linear measuring system, which provides position-dependent signals regarding the relative position of a tool and a workpiece and transmits this signal to a downstream-connected machine tool control for example.

The actual generation of the position-dependent signals in the measuring system 1 can be performed in a variety of ways, for example by means of opto-electronic scanning of a scale graduation with the aid of a scanning grid and detection of the resultant periodic signal modulation by means of photo-electric elements. It is of course possible to also employ other measuring principles in the device or method in accordance with the present invention which deliver position-dependent analog scanning signals, for example, magnetic, inductive or capacitive measuring processes. It is also of course possible to design position measuring systems in accordance with the present invention for linear as well as angular measuring. Various known possibilities for generating measured values are described by A. Ernst in his book entitled "Digitale Längen- und Winkelmeßtechnik" [Digital Linear and Angular Measuring Technology], by Verlag moderne Industrie AG, Landsberg, Vol. 3, pp. 8–29, 1993.

The analog scanning signals SA generated in the measuring system 1 are subsequently digitized in a processing unit 4 associated with the measuring system 1. Now the digitized scanning signals $S_D$ can be transmitted, for example in the form of TTL pulses to the evaluation and power supply unit 2 over signal transmission lines 5 for further evaluation. Alternatively it is also possible to further process the digitized scanning signals in the measuring system 1, for example to interpolate them, so that incremental counting pulses are present at the output side and can be transmitted in digital form to the evaluation and power supply unit 2.

As already suggested, the digital signals $S_D$ processed and transmitted in this way can no longer be used at the evaluation side for sufficiently judging the quality of the original analog signals $S_A$ as to whether there was a sufficient signal amplitude of the same, for example. Accordingly, in this preferred embodiment the measuring system related information to be transmitted relates to the quality of the analog scanning signals. In the case of direct transmission of analog scanning signals to the evaluation and power supply unit 2, they can be easily picked up for diagnostic purposes at the plug of the signal transmission lines. If only digital signals are transmitted, however, possibly existing malfunctions in the course of generating the analog scanning signals $S_A$ can only be detected upon the complete failure of signal transmission.

On the part of the measuring system 1 it has therefore been provided in accordance with the present invention to further supply the analog scanning signals to a diagnostic unit 6. The diagnostic unit 6 in this case takes on the task of generating information with regard to the analog scanning signals $S_A$ which characterizes them. The information generated by the diagnostic unit 6 can be the detection of the respective signal amplitude and the existing offset as well as a possible zero point determination, the phase relation check of a sine or cosine shaped signal and many others. For example, it is possible to check in this way the correct mounting of a scanning unit with relation to a scale graduation scanned by it, since a maximum signal amplitude only results with a correct alignment. Furthermore, the diagnostic unit 6 is in a position to check whether signal requirements are maintained within defined, predetermined threshold values. Depending on whether or not defined requirements are met, a signal corresponding to this information is generated by the diagnostic unit 6. For these purposes the diagnostic unit 6 can be designed in many ways using software and/or hardware, a preferred embodiment will be described in detail with reference to FIG. 5.

An additional testing unit 7 may optionally be included in the measuring system 1, which generates defined diagnostic information of interest, independently of the analog scanning signals. If a testing unit 7 is included, then not only are the analog scanning signals $S_A$ input to the diagnostic unit 6, but additionally or solely the signals generated by the testing unit 7 are input to the diagnostic unit 6. In a preferred embodiment the testing unit 7 can be, for example, an additional scanning unit which scans a separate scale track for diagnostic purposes.

In a preferred embodiment a signal preparation unit 8 is connected to the diagnostic unit 6. The signal preparation unit 8 edits the generated diagnostic information, so that it can be transmitted over one or several power supply lines 9, 10 of the measuring system 1 to the downstream-connected evaluation and power supply unit 2. In a preferred embodiment the signal preparation unit 8 is connected with power supply line 9 which is a voltage-carrying line. In a preferred embodiment of the present invention the already present power supply lines 9, 10 of the measuring system 1, through which the voltage supply for the individual components of the measuring system 1 takes place, are used for transmitting the measuring system-related information to the evaluation and power supply unit 2. Accordingly no separate additional connections for signal transmissions are needed. In the preferred embodiment shown in FIG. 1 a total of two power supply lines 9, 10 between the measuring system 1 and the evaluation and power supply unit 2 are provided, one power supply line 10 of which is used for the ground connection, while the other power supply line 9 carries the required operating voltage for the measuring system 1 or of individual measuring system components.

A number of possibilities also exist for the design of the signal preparation unit 8 and the manner of transmitting measuring system-related information, some variants of which will be explained in greater detail hereinafter. However, all these embodiments of the signal preparation device have in common that the respective information is transmitted in the form of defined-coded signals to one or several of the power supply lines 9, 10. The appropriate coding of the signals or the information for transmission is performed by the signal preparation unit 8. Again a number of different known methods are available for the actual coding, such as current and/or voltage modulation methods, frequency and/or amplitude modulation methods, making defined changes in the current consumption of the measuring system as a function of the respective information, etc. For example, it is possible to transmit the respective signal amplitudes of the analog scanning signals $S_A$ in a frequency-modulated manner.

An analysis unit 11 is associated with the input side of the evaluation and power supply unit 2 for decoding and actual analysis of the information transmitted by the measuring unit 1. There are also a number of preferred embodiments for the design of the analysis unit 11, which of course is the function of the respective type of signal editing and transmission selected.

Preferably a display unit 12 is connected with the output of the analysis unit 11 which is used for the visual representation of the transmitted information. Several embodiments of the display unit 12 exist, for example, for detailed evaluation requirements, the use of a display screen is possible, or for simpler requirements, a simply constructed display unit 12 can also be made as digital display or realized with the aid of LEDs.

Accordingly, it is possible with the aid of the device or method in accordance with the present invention to make measuring system-related information of interest available to the user, for example, with respect to the analog scanning signals $S_A$, on the evaluation side, without requiring additional transmission lines. System-related information may be necessary for mounting purposes prior to the employment of the actual measuring system, for example, or it may also be necessary later during the measuring operation for the detection of possible system malfunctions. In this case it should be assured that the generation and transmission of the actual position-dependent signals is affected as little as possible by the transmission of the information on the power supply line. This can be assured, for example, in that slow rise times of the respective signals are selected.

Besides the described employment of measuring systems which provide only digital signals, the present invention can also be employed in measuring systems which transmit analog signals on the output side to the evaluation unit.

Various preferred embodiments of the signal preparation unit 8, as well as the analysis unit 11 will be described with reference to FIGS. 2, 3a and 3b. Functionally equivalent components are here provided with reference numerals identical to FIG. 1.

Figure 2:
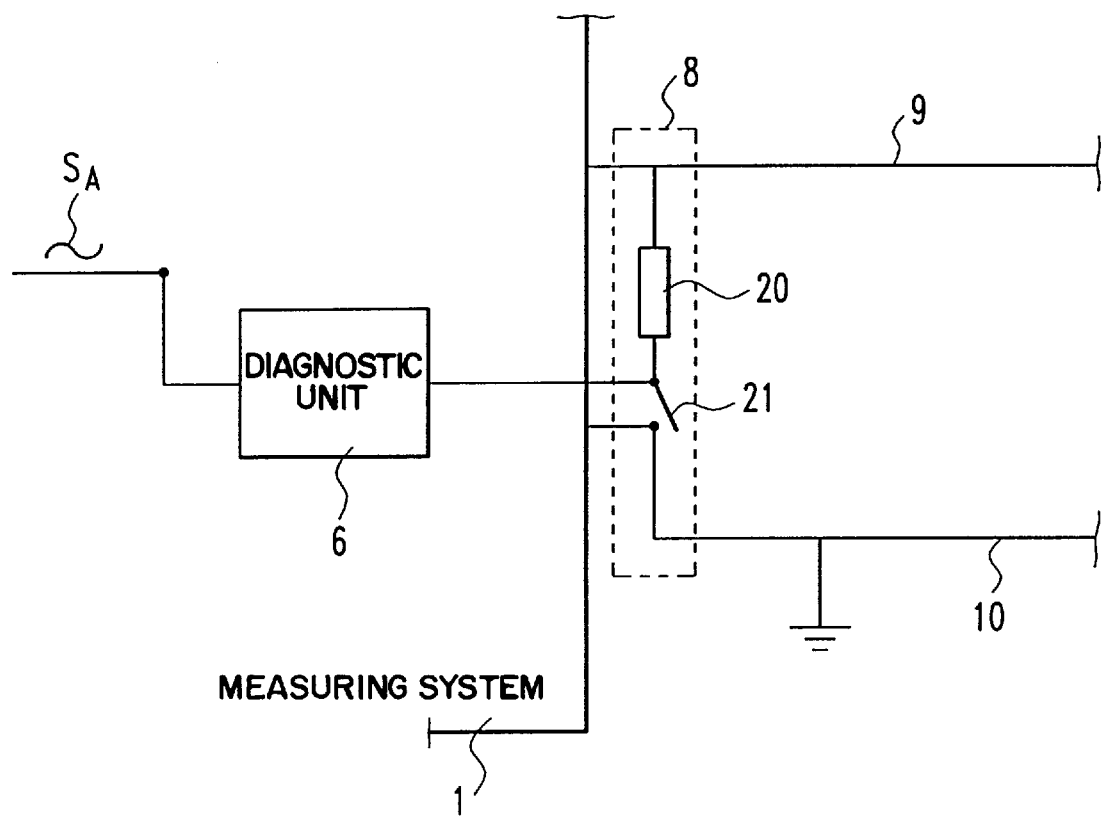
FIG. 2 illustrates a portion of the block diagram shown in FIG. 1 in greater detail.

FIG. 2 illustrates a portion of the block diagram shown in FIG. 1 in greater detail. It is not necessary that the signal preparation unit be located in the measuring unit although in another preferred embodiment it may be. The analog scanning signals $S_A$ generated by the scanning unit are sent to the diagnosis unit 6 in the measuring system 1, as described above. There a diagnosis takes place where preferably a determination is made whether the signal amplitudes lie within a predefined range. In this preferred embodiment the measurement system-related information therefore relates to the quality of the analog scanning signals. The diagnostic unit 6 outputs a signal which contains the information as to whether the predefined amplitude range has been maintained, i.e. only two possible information states are available on the output side. The signal preparation unit 8 connected downstream of the diagnosis unit 6 is formed by an electrical resistor 20 and a switching element 21. The electrical resistor 20 can be switched between the two power supply lines 9, 10 described in FIG. 1 by the switching element 21 which can be actuated from the diagnostic unit 6. For example, it is possible in case of an insufficient signal amplitude of the analog scanning signals $S_A$ to close the switch element 21 when the switch 21 is closed the resistor 20 couples power supply lines 9 and 10 together which changes the power consumption of the measuring system. Accordingly, coding of the information to be transmitted takes place in this preferred embodiment by the defined change in the power consumption of the measuring system 1.

With this type of coding of the signals it must also be assured that too great a voltage drop in the power supply lines 9, 10 is avoided in order to assure the continued functional capability of the measuring system 1. This means that the additional power consumption of the measuring system 1 because of the additional resistor 20 is not allowed to become too high, which can be assured by an appropriate size of the resistor. Alternatively it is possible to assure a constant voltage supply for the measuring system 1 by an appropriate voltage regulation with the aid of a regulating unit (not shown).

It will be explained with reference to FIGS. 3a and 3b how signal coding of this type, the analysis can be performed by the evaluation and power supply unit 2. In a first preferred embodiment shown in FIG. 3a the analysis unit 11 contains a current measuring device 31 which checks the power consumption of the measuring system. Accordingly, if the resistor 20 is coupled between the power supply lines because of the previously mentioned drop below the threshold amplitudes, a clearly higher power consumption results which can be detected at the current measuring device 31 of the analysis unit 11. The display unit 12 suitable with this type of analysis unit 11 may be embodied as a measuring device with a pointer, for example.

Figure 3A:
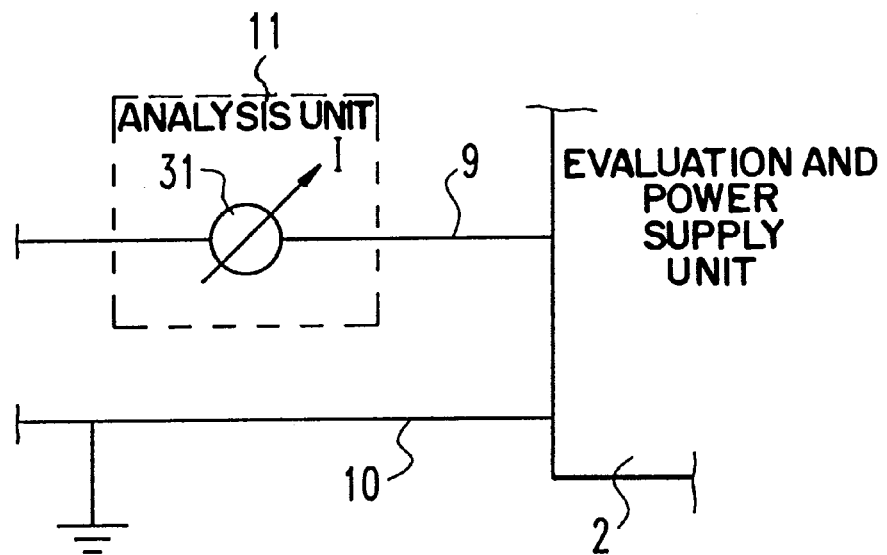
FIGS. 3a and 3b are block diagrams illustrating various embodiments of an analysis unit according to a preferred embodiment of the present invention.
Figure 3B:
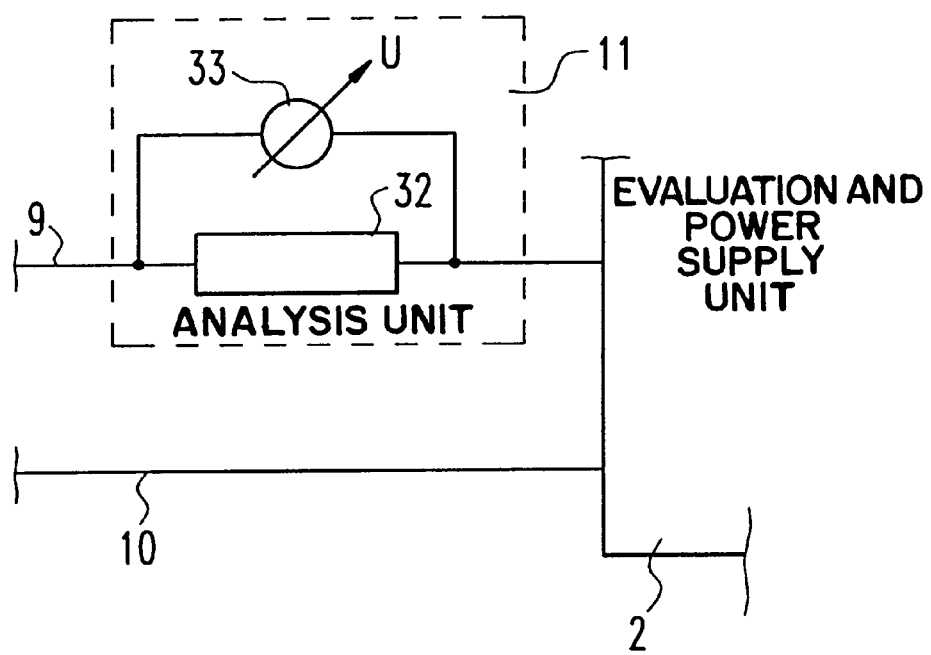

In another preferred embodiment of the analysis unit 11 shown in FIG. 3b, it includes a resistor 32 coupled to power supply line 9 through which the voltage drop is measured by a voltage measuring device 33. The voltage measured is proportional to the power consumption of the measuring system which can be changed in a definite manner by switching in the resistor 20.

The two preferred embodiments shown as previously described in accordance with FIGS. 3a and 3b can be integrated in a plug (not shown) of the power supply lines 9, 10. For example, it is possible to connect LEDs with the current 31 or voltage 33 measuring device in these preferred embodiments and to integrate them in a plug which performs the function of the display unit and provide a visual signal when the amplitude falls below defined threshold values.

Figure 4:
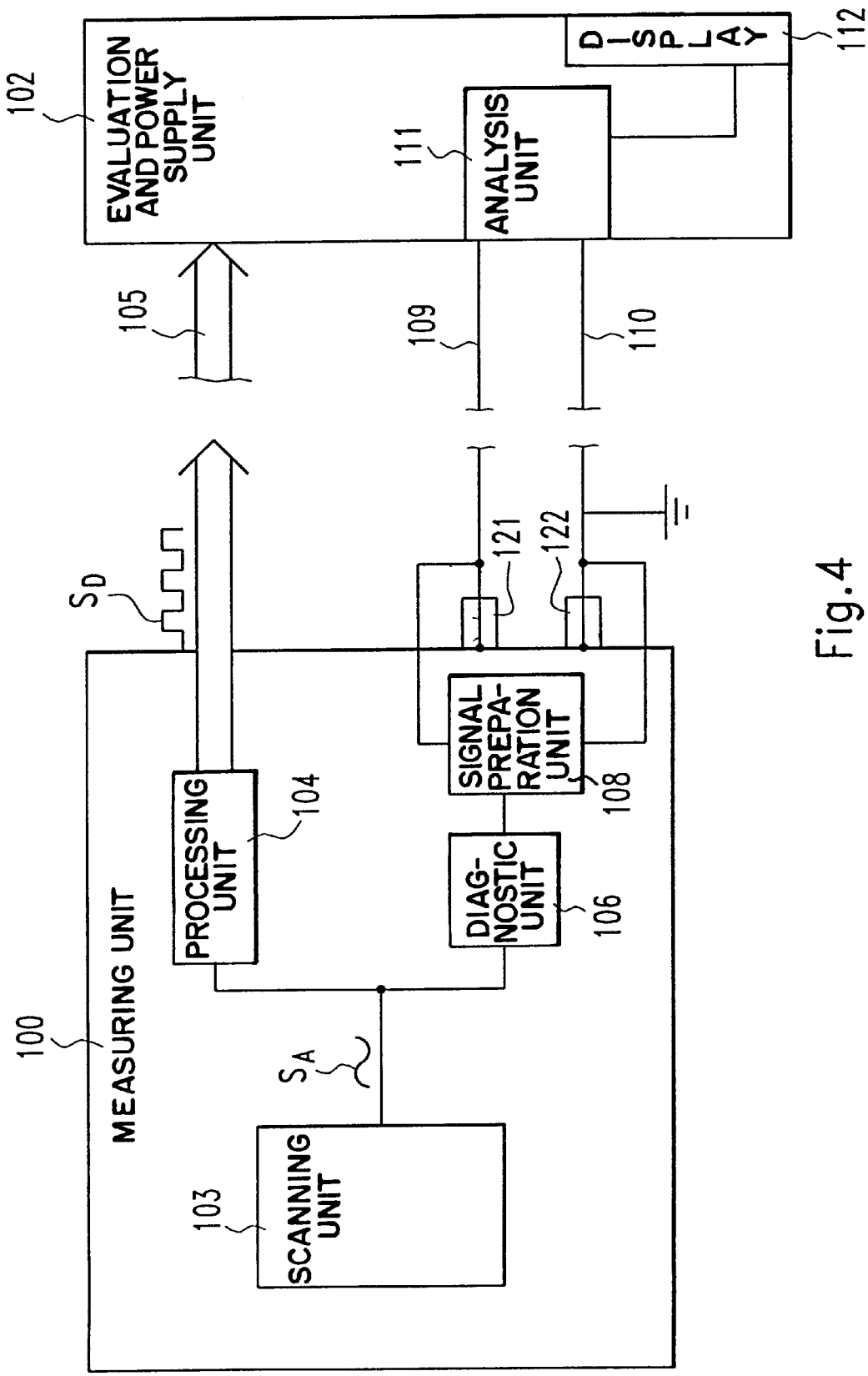
FIG. 4 is a block diagram of a position measuring system according to a preferred embodiment of the present invention.

FIG. 4 is a block diagram of another preferred embodiment of a position measuring device according to a preferred embodiment of the present invention. The design of the measuring system according to this preferred embodiment is similar to the system shown in FIG. 1, i.e., it includes a measuring unit 100, an evaluation and power supply unit 102, a scanning unit 103, a processing unit 104, a diagnostic unit 106, a signal preparation unit 108 an analysis unit 111, a display unit 112, signal transmission line 105 and power supply lines 109 and 110.

In contrast to the previously described preferred embodiment, the signal preparation unit 108 is preferably embodied as a modulator with whose aid a current or voltage modulation of the signals to be transmitted on the power supply lines 109, 110 is possible. Accordingly, the defined coding of the information to be transmitted regarding the analog scanning signals $S_A$, output by the diagnostic unit 106, takes place by modulation of the current or voltage on the power supply lines 109, 110. Filter elements 121, 122 are additionally arranged at the measuring unit 100 inputs for the power supply lines 109, 110, in order to assure a trouble-free current and voltage supply in spite of the modulation of current or voltage taking place on these lines 109, 110. The required separation of the signals modulated on the measuring system 100 can be assured by means of suitable filters or voltage stabilizers as filter elements 121, 122.

The analysis unit 111 in the evaluation unit 102 then must of course be configured in this manner of information coding and transmission in order to make possible a corresponding signal demodulation.

FIGS. 5a and 5b are block diagrams of diagnostic and signal preparation unit 230; and an analysis unit 211 and display 212; respectively, of a position measuring system according to another preferred embodiment of the present invention. The remaining components of the measuring system correspond to those of the previously described preferred embodiments. The diagnostic and signal preparation unit 230 is here disposed in a common component of the measuring system.

The diagnostic and signal preparation unit 230 includes a summer 221, a rectifier 222, a low pass filter 223, a voltage to frequency converter 224, a bandpass filter 225, a time to switch 226 and a switch 227. The analog scanning signals $S_A$ are input to the diagnostic and signal preparation unit 230, and particularly the summer 221 where initially a summing signal is formed from both sine and cosine shaped signals. The resultant summing signal is subsequently rectified in the rectifier stage 222 and is filtered in the low-pass filter 223. The voltage $U_s$ present at the output of the low-pass filter 223 is proportional to the amplitude of the sum signal from the two analog scanning signals. This voltage $U_s$ is converted in the voltage-frequency converter 224 to a sine, rectangular or triangular shaped signal of a frequency, which again is proportional to the voltage $U_s$. Subsequently this signal can be further amplified, filtered by the band-pass filter 225 and switched to the power supply line 209. More particularly, the output of the band-pass filter 225 is connected with a switching element 228 preferably a transistor, which in turn couples a resistor 220 of suitable dimensions to one of the power supply lines 209. Thus, the result is a time-dependent variation of the power consumption of the measuring system with a frequency which is proportional to the amplitude of the summed signal from the analog scanning signals. In this preferred embodiment switch element 227 which is actuated by timer switch 226 to maintain this type of signal transmission only for a defined length of time, for example, at the start of measuring operations, and to shut it off thereafter.

The analysis unit 211 shown in FIG. 5b includes an electrical resistor 215 which is switched into the voltage-carrying power supply line 209 and through which the voltage is tapped. The voltage dropping at the resistor 215 here behaves proportional to the power consumption of the measuring device which, as explained in FIG. 5a, changes with a defined frequency. For signal processing the voltage signal is amplified as well as band-pass filtered by means of an amplifier stage 216. The generation of a voltage, which is proportional to the frequency and is used as the carrier of the transmitted information, takes place in a downstream connected frequency-voltage converter 217. With a signal generation in accordance with FIG. 5a, the voltage detected in this way is proportional to the amplitude of the summed signal of the two analog, sine and cosine shaped scanning signals. The voltage signal can be made visible by means of a display unit 212 connected on the output side with the frequency-voltage converter 217.

Alternatively to this type of signal analysis it is possible to display the voltage dropping via a resistor in the power supply line in an oscilloscope, for example.

While this invention has been shown and described in connection with the preferred embodiments, it is apparent that certain changes and modifications, in addition to those mentioned above, maybe made from the basic features of the present invention. Accordingly, it is the intention of the Applicant to protect all variations and modifications within the true spirit and valid scope of the present invention.

What is claimed is:

1. A method for the transmission of information between a measuring unit of a position measuring system and an evaluation and power supply unit connected therewith through at least a first power supply line, wherein the measuring unit includes a scanning unit, the method comprising the steps of:

generating position-dependent analog scanning signals $S_A$ with the scanning unit;

generating information related to the quality of the position-dependent analog scanning signals; and transmitting the information related to the quality of the position dependent analog scanning signals through the first power supply line coupling the measuring unit to the evaluation and power supply unit.

2. A method according to claim 1 wherein the step of generating information is performed by a diagnostic unit located in the measuring unit.

3. The method according to claim 2, wherein the diagnostic unit checks whether signal requirements are maintained within defined predetermined threshold values.

4. The method according to claim 1, further comprising the step of coding information before transmitting to the evaluation and power supply unit.

5. The method according to claim 4 wherein the step of coding the information is performed by a signal preparation unit coupled to the diagnostic unit.

6. The method according to claim 4, wherein the signal coding is performed by modulating the information to be transmitted.

7. The method according to claim 6, wherein the signals related to the quality of the position dependent analog scanning signals are separated from on another by a filter element.

8. The method according to claim 4, wherein the coding is performed by changing the power consumption of the scanning unit in a defined manner.

9. The method according to claim 8, wherein the changing of the power consumption of the scanning unit is achieved by switching a resistor between the first power supply line and a second power supply line.

10. The method according to claim 9, wherein the size of the resistor is chosen so that any additional power consumption caused by the changing of the power consumption is not allowed to become too high.

11. The method according to claim 9, wherein the changing of the power consumption of the scanning unit is detected by measuring the current of at least the first power supply line with a current measuring device.

12. The method according to claim 11, wherein the current measuring device is integrated in a plug that provides a visual signal related to the quality of the position dependent analog scanning signals.

13. The method according to claim 9, wherein the changing of the power consumption of the scanning unit is detected by measuring the voltage of at least the first power supply line with a voltage measuring device.

14. The method according to claim 13, wherein the voltage measuring device is integrated in a plug that provides a visual signal related to the quality of the position dependent analog scanning signals.

15. The method according to claim 8, wherein a signal related to the power consumption of the scanning unit has a frequency which is proportional to the amplitude of a summed signal from the position dependent analog scanning signals.

16. The method according to claim 4, further comprising the steps of decoding and analyzing the transmitted information by the evaluation and power supply unit.

17. The method according to claim 16 wherein the steps of decoding and analyzing are performed by an analysis unit located in the evaluation and power supply unit.

18. The method according to claim 16, wherein the steps of decoding and analyzing are performed by measuring current in the first power supply line.

19. The method according to claim 1, wherein the information transmitted on the first power supply line relates to the amplitudes of the analog scanning signals $S_A$.

20. The method according to claim 1, wherein the information is related to the amplitudes of the analog scanning signals.

21. The method according to claim 1, wherein the information is related to the offset between the analog scanning signals.

22. The method according to claim 1, wherein the information is related to a zero point determination of the analog scanning signals.

23. The method according to claim 1, wherein the information is related to the phase relation between the analog scanning signals.

24. The method according to claim 1, wherein the information is generated continuously during all measurements performed by the position measuring system.

25. A position measuring system which includes a scanning unit located in a measuring unit generating position dependent analog scanning signals, as well as an evaluation and power supply unit coupled with the measuring unit by at least a first power supply line, the system comprising:
   a diagnostic unit disposed in the measuring unit wherein the diagnostic unit generates information related to the quality of the position dependent analog scanning signals; and
   a signal preparation unit coupled to the measuring unit and coupled to the diagnostic unit wherein the signal preparation unit prepares the information related to the quality of the position dependent analog scanning signals so that it can be transmitted as signals over the first power supply line.

26. The position measuring system according to claim 25, wherein the signal preparation unit codes the information to be transmitted.

27. The position measuring system according to claim 26, wherein the information is voltage modulated.

28. The position measuring device according to claim 27, wherein a filter element is arranged at the measuring unit for separating the voltage modulated information.

29. The position measuring system according to claim 26 wherein the information is current modulated.

30. The position measuring device according to claim 29, wherein a filter element is arranged at the measuring unit for separating the current modulated information.

31. The position measuring system according to claim 26, wherein the signal preparation unit causes a definite change in the power consumption of the measuring system.

32. The position measuring system according to claim 31, wherein the signal preparation unit comprises an electrical resistor which can be selectively switched to the first power supply line.

33. The position measuring system according to claim 31, further comprising a regulating unit which assures a constant supply voltage to the measuring system.

34. The position measuring system according to claim 26, wherein the signal preparation unit modulates the voltage in the first power supply line.

35. The position measuring system according to claim 25, further comprising an analysis unit disposed in the evaluation and power supply unit which decodes and analyzes the transmitted signals.

36. The position measuring system according to claim 35, further comprising a display unit coupled to the analysis unit which displays a visual representation of the transmitted information.

37. The position measuring system according to claim 35, wherein the analysis unit is a current measuring device which is switched into the first power supply line.

38. The position measuring device according to claim 37, wherein the current measuring device is integrated in a plug.

39. The position measuring device according to claim 25, wherein the information is related to the amplitudes of the analog scanning signals.

40. The position measuring device according to claim 25, wherein the information is related to the offset between the analog scanning signals.

41. The position measuring device according to claim 25, wherein the information is related to a zero point determination of the analog scanning signals.

42. The position measuring device according to claim 25, wherein the information is related to the phase relation between the analog scanning signals.

43. The position measuring device according to claim 25, wherein the information is generated continuously during all measurements performed by the position measuring system.

44. A method for the transmission of information between a measuring unit of a position measuring system and an evaluation and power supply unit connected therewith through at least a first power supply line wherein the measuring unit includes a scanning unit, the method comprising the steps of:
   generating position dependent analog scanning signals with the scanning unit;
   generating information related to the quality of the position dependent analog scanning signals; and
   transmitting the information related to the quality of the position dependent analog scanning signals through the first power supply line coupling the measuring unit to the evaluation and power supply unit, wherein the information is coded by changing the power consumption of the scanning unit in defined way.

45. A method according to claim 44, wherein the coding takes place by switching a resistor between the first power supply line and a second power supply line.

46. A method according to claim 44, wherein the changing of the power consumption is detected by measuring the current of at least the first power supply line.

47. A method according to claim 44, wherein the changing of the power consumption is detected by measuring the voltage of at least the first power supply line.

48. A method according to claim 44, wherein a signal related to the power consumption of the scanning unit is generated having a frequency which is proportional to the amplitude of the summed signal from the position dependent analog scanning signals.

49. The method according to claim 44, wherein the information is related to the amplitudes of the analog scanning signals.

50. The method according to claim 44, wherein the information is related to the offset between the analog scanning signals.

51. The method according to claim 44, wherein the information is related to a zero point determination of the analog scanning signals.

52. The method according to claim 44, wherein the information is related to the phase relation between the analog scanning signals.

53. The method according to claim 44, wherein the information is generated continuously during all measurements performed by the position measuring system.

54. A position measuring system which includes a scanning unit located in a measuring unit generating position dependent analog scanning signals, as well as an evaluation and power supply unit coupled with the measuring unit by at least a first power supply line, the system comprising:
   a diagnostic unit disposed in the measuring unit wherein the diagnostic unit generates information related to the quality of the position dependent analog scanning signals; and
   a signal preparation unit coupled to the measuring unit and coupled to the diagnostic unit wherein the signal preparation unit prepares the information related to the quality of the position dependent analog scanning signals so that it can be transmitted as signals over the power first supply line, wherein the measuring unit comprises a coding device that codes the information related to the quality of the position dependent analog scanning signals by changing the power consumption of the scanning unit in a defined way.

55. A position measuring system according to claim 54, wherein the coding device comprises a resistor which can be switched between the first power supply line and a second power line.

56. A position measuring system according to claim 55, comprising a detector for detecting the change in power consumption.

57. A position system according to claim 56, wherein the detector comprises a current measuring device.

58. A position measuring system according to claim 57, wherein the current measuring device is integrated in a plug.

59. A position measuring system according to claim 58, wherein the plug comprises a visual indication of the transmitted signals.

60. A position measuring system according to claim 56, wherein the detector comprises a voltage measuring device.

61. A position measuring system according to claim 60, wherein the voltage measuring device is integrated in a plug.

62. A position measuring system according to claim 61, wherein the plug comprises a visual indication of the transmitted signals.

63. A position measuring system according to claim 55, wherein the size of the resistor is chosen so that any additional power consumption caused by the changing of the power consumption is not allowed to become too high.

64. A position measuring system according to claim 54, wherein the coding device is connected with a display for providing a visual indication of the transmitted signals.

65. The position measuring device according to claim 54, wherein the information is related to the amplitudes of the analog scanning signals.

66. The position measuring device according to claim 54, wherein the information is related to the offset between the analog scanning signals.

67. The position measuring device according to claim 54, wherein the information is related to a zero point determination of the analog scanning signals.

68. The position measuring device according to claim 54, wherein the information is related to the phase relation between the analog scanning signals.

69. The position measuring device according to claim 54, wherein the information is generated continuously during all measurements performed by the position measuring system.

* * * * *

UNITED STATES PATENT AND TRADEMARK OFFICE
CERTIFICATE OF CORRECTION

PATENT NO. : 6,114,947
DATED : September 5, 2000
INVENTOR(S) : Sebastian Tondorf It is certified that error appears in the above-identified patent and that said Letters Patent is hereby corrected as shown below:

Claim 4,
Line 2, delete "coding information before transmitting" and substitute -- coding the information before transmitting the informtion -- in its place.

Claim 44,
Line 16, delete "in defined" and substitute -- in a defined -- in its place.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*